United States Patent
Harrington (10) Patent No.: US 6,864,994 B1
(45) Date of Patent: Mar. 8, 2005

(54) HIGH-SPEED, HIGH-QUALITY DESCREENING SYSTEM AND METHOD

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/488,039

(22) Filed: Jan. 19, 2000

(51) Int. Cl.$^7$ .............................. G06F 15/00; G06K 1/00
(52) U.S. Cl. .................... 358/1.9; 358/3.08; 358/3.24; 358/3.27; 358/533; 358/540; 382/260; 382/261; 382/264; 382/266; 382/275
(58) Field of Search ........................ 358/1.9, 534, 462, 358/500, 518, 448, 536, 3.07, 3.2, 447, 3.08, 3.26, 540, 533; 382/254, 260, 261

(56) References Cited

U.S. PATENT DOCUMENTS

| | | | | |
|---|---|---|---|---|
| 4,630,125 | A | | 12/1986 | Roetling ..................... 358/280 |
| 4,841,377 | A | | 6/1989 | Hiratsuka et al. ........... 358/283 |
| 5,027,078 | A | | 6/1991 | Fan ............................. 358/456 |
| 5,243,444 | A | | 9/1993 | Fan ............................. 358/456 |
| 5,343,309 | A | | 8/1994 | Roetling ..................... 358/456 |
| 5,506,699 | A | * | 4/1996 | Wong ........................ 358/3.08 |
| 5,799,112 | A | * | 8/1998 | de Queiroz et al. ........ 382/254 |
| 6,347,160 | B1 | * | 2/2002 | Cheung et al. ............. 382/260 |
| 2002/0093686 | A1 | * | 7/2002 | Fan et al. ................... 358/3.08 |
| 2002/0154339 | A1 | * | 10/2002 | Kuo et al. .................. 358/3.08 |
| 2002/0186894 | A1 | * | 12/2002 | Ferguson .................... 382/261 |

OTHER PUBLICATIONS

Kollias, S.; Tsai, Tu–Chih; Image Halftoning and Reconstruction using a Neural Network, 1989, IEEE, 1787–1790.*

Kuo et al., Color Halftone Document Segmentation and Descreening, 2001, IEEE, 1065–1068.*

Kurekin et al., Modified Vector Sigma Filter and Its Application to Color and Multichannel Remote Sensing Radar Image Processing, Jul. 1999, SPIE Conference on Applications of Digital IMage Processing XXii, SPIE vol. 3808, 423–434.*

Hein et al., Halftone to Continuous–Tone Conversion of Error–Diffusion Coded Images, 1995, IEEE, 208–216.*

Lee, J.S., Digital Image Smoothing and the Sigma Filter, 1983, Computer, Vision, Graphics, and Image Processing, vol. 24, 255–269.*

Kuo et al. Color Halftone Descreening based on Color Sigma Filters, Dec. 2000, SPIE, vol. 4300, 377–385.*

* cited by examiner

Primary Examiner—Kimberly Williams
Assistant Examiner—Melanie Vida
(74) Attorney, Agent, or Firm—Oliff & Berridge, PLC (57) ABSTRACT

A system and method descreen halftone images into a continuous tone image while preserving edge detail and reducing initial image blur. The descreening can be applied to monochrome or color images. Descreening is achieved by first using a low pass filter to form a blurred image of the original, which is used to guide future image filtering, but which further filtering is applied to the original image. The intelligent filtering is provided by a Sigma filter, which can be performed in a single iteration and sized and shaped according to values of the blurred image. The system and method can take a block-oriented approach that performs analysis for an entire block of pixels rather than on individual pixels. This further improves the implementation speed of the process.

35 Claims, 6 Drawing Sheets

(3 of 6 Drawing Sheet(s) Filed in Color)

HIGH-SPEED, HIGH-QUALITY DESCREENING SYSTEM AND METHOD

BACKGROUND OF THE INVENTION

1. Field of Invention

The present invention relates to image processing systems and methods having a capability for processing and reproducing halftone original images and more particularly to systems and methods for descreening halftone images without screen structure, and well as other halftone images, to continuous tone images with increased quality and efficiency.

2. Description of Related Art

Most printing devices are based on binary technologies. That is, they print using ON/OFF, ink or non-ink printing. To simulate intermediate colors or gray levels, halftoning is used. Halftoning involves use of patterns or ink dots at a high spatial frequency to simulate to the eye an integrated gray scale image. Halftoning techniques are also used to render electronic color images on common electronic display devices that use color mapping to limit the number of bits per pixel and thereby reduce memory requirements.

The use of halftoning can, however, cause problems if a printed copy of the image is desired. This is particularly problematic when using a digital copier. When copying, the image is typically scanned and then printed. The printer has its own halftone pattern that can interfere with the original halftone to produce low-frequency moire patterns that can be objectionable to the viewer of the printed copy. Similar problems can occur if printed copies of an electronic image originally intended for display are desired. In particular, it is possible that the original halftone may be much easier to see in print than on display and may be objectionable to the viewer.

Thus, it is difficult to process halftone images. Therefore, a halftone is often converted to a continuous tone image to enable processing and then reconverted to halftone for printing.

Image processing systems used with printers in reprographic systems typically require a capability for converting halftone images to continuous tone images to meet reconversion needs and for converting scanned halftone images to continuous tone images that can then be processed by any of a large variety of enhancement algorithms commonly available for continuous tone images.

The halftoning process loses some image information in the conversion of the original continuous tone image to a halftone image. The reconversion of a halftone image to a continuous tone image accordingly is essentially an estimation process since the halftoning process cannot be reversed exactly to reproduce a continuous tone image identical to the original image.

The majority of images currently processed in the printing industry are converted from continuous tone to halftone using an ordered dithering method because most printers can only print dithered images. Generally, ordered dithering is a process in which a scanned continuous signal from a continuous tone image is converted to a series of black (1 or ink) or white (0 or no ink) pixels with the pixel values determined by the pattern of a threshold or dither matrix to which the scanned signal is applied.

Another process used to convert continuous tone images to halftone images is called error diffusion. No special thresholding matrix is used in the error diffusion process. Instead, a single threshold is applied to the whole image. Generally, image pixels are processed sequentially, i.e., the first pixel is made either 1 or 0 according to whether its gray level is above or below a predetermined threshold value such as 0.5. The first pixel error is then carried forward and added to the gray value of the unprocessed surrounding pixels in determining whether these pixels are above or below the threshold value. The resultant errors are then carried forward, and the process is continued until the image is completely processed. These halftone screens are typically removed as part of a conversion to continuous tone by low-pass filtering. This removes the high-frequency halftone pattern, but also removes the high frequency information (such as sharp edges) from the image. This results in a picture that looks blurred.

Most attempts at avoiding the loss of image information have been experimented with using halftone originals that are structured, such as those created from ordered dithering patterns. However, until now, such methods were not sufficiently successful when a random-dot halftoning method, such as error diffusion, or a stochastic method, such as blue-noise masking, was used.

The classic prior art method for converting halftone images to continuous tone images, i.e., for "unscreening" continuous tone images from halftone images, applies a low-pass filter to the halftone image data. The low-pass filter method by its nature typically blurs image edges or at least loses fidelity of edge information (fine detail) as a result of the filter conversion process.

U.S. Pat. No. 4,630,125 to Roetling, and assigned to the present assignee, discloses a method of reconstructing a continuous tone image for grayscale values that have been converted to a halftone image of black and white spots. The reconstruction method involves isolation of each spot of a halftone image along with a neighborhood of surrounding spots, and, for each neighborhood, comparing a maximum screen pattern value producing a white spot with a minimum screen value producing a black spot. If the minimum screen value giving a black spot is greater than the maximum screen value giving a white spot, then the grayscale pixel value of the isolated spot is the average of the maximum and minimum screen values just described. If the minimum screen value giving a black spot is less than the maximum screen value giving a white spot, then the process is repeated after deleting that portion of the neighborhood of surrounding spots containing the maximum or minimum screen value furthest from the isolated spot. Use of the Roetling scheme is limited to orthographic or digitally created and stored dithered images since it is based on the regularity of dots in a half-tone image created with a dither.

Another U.S. Pat. No. 4,841,377 issued to Hiratsuka et al. discloses a method for estimating an original continuous tone image from a stored binary image. The method involves, inter alia, setting a plurality of scanning apertures in a binary image formed of a dither matrix, selecting one scanning aperture satisfying a predetermined condition for each picture element of a continuous image to be estimated, and estimating the continuous image on the basis of the number of white or black picture elements in the scanning aperture selected. The Hiratsuka method is similarly limited to dithered halftone images.

More recently, U.S. Pat. No. 5,027,078, issued to the present inventor, Z. Fan, discloses a method for converting halftone images to continuous tone images. The Fan method is an improvement over the Roetling method through the application of "logic filtering." This logic-filter method provides best results for digitally created and stored halftone images but it is also limited to dithered halftone images.

A prior attempt at reduction of blurring of random halftone dots can be found in U.S. Pat. No. 5,243,444 to Fan, assigned to the same assignee as the present invention and incorporated herein in its entirety. This method first applies a small initial blurring and then iteratively applies Sigma filters. This method, however, can be slow because the Sigma filters must be calculated (and recalculated) for each pixel. This method also suffers from some initial blurring as the Sigma filter is applied to the initially blurred image.

Another attempt can be found in U.S. Pat. No. 5,343,309 to Roetling, assigned to the same assignee as the present invention and incorporated herein in its entirety. This method employs low-pass filtering to generate a first approximation image (FAI). A control then applies an adaptive filter to each pixel of an image as a function of an associated pixel spatial gradient. Then, a number of iterations of filtering are performed, using the output from a previous iteration an input for the subsequent iteration to generate a continuous tone image. However, this requires an iterative process that is time inefficient.

In summary, the prior art generally has had shortcomings in preserving edge smoothness and avoiding edge blur during the "unscreening" of halftone images into contone images. Further, the solutions that did have limited success in reducing edge blurring were very time and calculation intensive, as multiple filtering iterations were necessary.

SUMMARY OF THE INVENTION

According to an aspect of the systems and methods of the invention, a descreening process is provided that "unscreens" halftone images while preserving edge detail and having reduced initial blurring. The descreening can be applied to monochrome or color images.

According to another aspect of the systems and methods of the invention, an initial low pass filtering of the image is used only to form a blurred image, which is used to guide future image filtering, in which more intelligent filtering is then guided by analysis of the low pass image, but which is applied to the original image. This avoids otherwise inevitable loss of detail, which most other methods encounter.

According to another aspect of the systems and methods of the invention, the intelligent filtering is provided by a Sigma filter, which preferably is performed in a single iteration and sized and shaped according to values of the blurred image.

According to another aspect of the systems and methods of the invention, the system takes a block-oriented approach that performs analysis for an entire block of pixels rather than on individual pixels. This further improves the implementation speed of the process.

According to another aspect of the systems and methods of the invention, the intelligent filtering selects between a Sigma filter and alternative filtering such as a simple low-pass filter according to values of the blurred image.

The inventive methods and systems due to their quality representation, can use a fast implementation of an unscreening method that takes some shortcuts to further improve implementation speed, although even better results can be achieved, at a sacrifice of ultimate processing speed, when slower implementation is performed.

As mentioned, whereas some prior art processes operated on the blurred image itself, the invention instead uses a blurred or filtered version of the image to select pixels for use in pixel processing. The actual processing then uses the original image data to generate a revised pixel value.

In accordance with the present invention, the image processing system incorporates a Sigma filter algorithm to provide improved image conversion and improved edge-preserving smoothing. While it is possible to implement an iterative Sigma filter procedure, this is not required to attain a quality image.

Since the algorithm requires no information about screen properties of an image being converted, it is especially suitable for use with halftone images having no screen structure, i.e., error-diffused halftone images or halftone images scanned in low resolution.

In accordance with a preferred fast implementation embodiment of the invention, the block-approach involves replacing individual pixel values with an average of those pixels within the block that have a blurred value close to the blurred value of a pixel being replaced. Thus, by acting in blocks rather than individual pixels, processing speed can be increased.

In the description that follows, halftones are defined to have pixel values of 0 and 1, and grey images are defined to have pixel values in the range of 0 to 1.

An image processing system is provided for converting unscreened and other halftone images to continuous tone images. The system comprises: means for receiving an original halftone image including a plurality of pixels; means for generating a blurred image from the original halftone image using low pass filtering; means for setting Sigma filter data using the blurred image; means for descreening the original halftone image by applying the Sigma filter to pixels of the original halftone image; and means for generating an output continuous tone image containing Sigma filtered pixels for storage or subsequent processing.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The accompanying drawings, which are incorporated in and constitute a part of this specification, illustrate one embodiment of the invention and together with the description provide an explanation of the objects, advantages and principles of the invention. In the drawings.

DETAILED DESCRIPTION OF PREFERRED EMBODIMENTS

Figure 1:
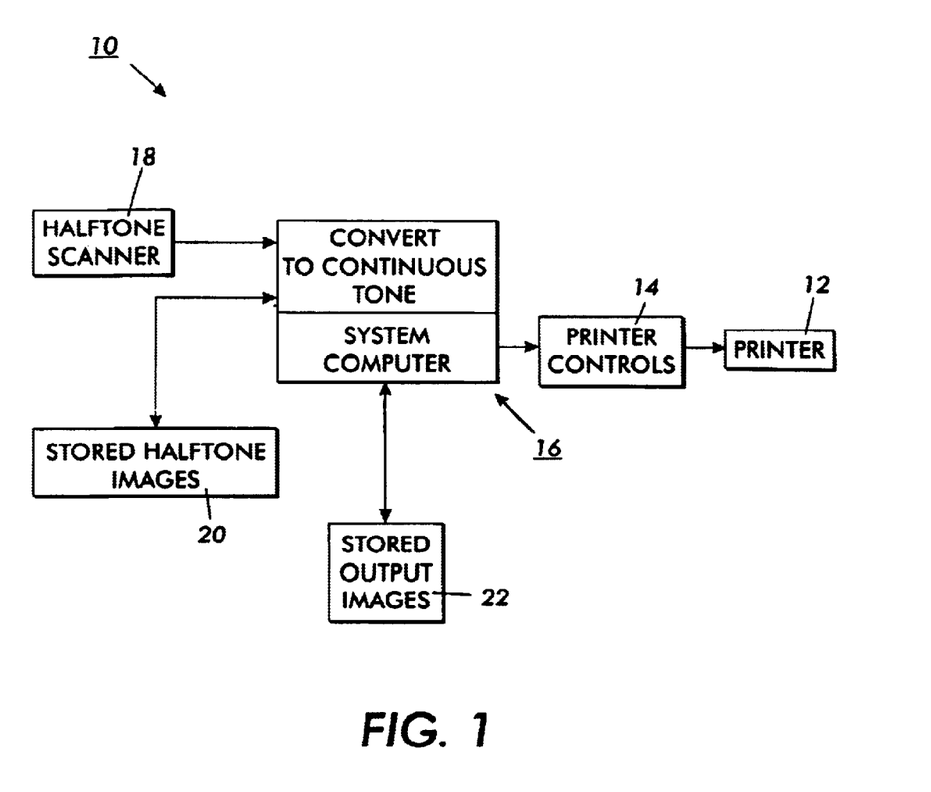
FIG. 1 shows a reprographic system in which the present invention is applied.

An image processing system 10 shown in FIG. 1 includes a conventional printer 12 that is operated in accordance with the invention by printer controls 14 under the control of a system computer 16. Input halftone images are obtained from a scanner 18 or from a first memory 20. The system computer 16 is programmed to convert the halftone images to continuous tone images and to edit the continuous tone images as desired for subsequent printing or display. For example, the continuous tone images may be magnified or scaled or edited for tone reproduction.

Another memory 22 is used to store contone images that have been converted from halftone images and edited as desired. When a stored contone image is to be printed, it is retrieved from storage and halftoned for printing through the printing controls 14.

In accordance with a first aspect of the invention, scanned black and white images are first converted or "unscreened" to contone images, and thereafter edited as desired and reconverted to halftone images for print processing. Halftone images in the memory 20 are stored for subsequent conversion and processing in accordance with the present invention. The scanned or stored input images may be error-diffused or other images with no screen structure or they may be dithered images with a screen structure.

There are various applications in which it is desirable to convert halftone images with no screen structure or they may be dithered images with a screen structure. However, the present invention is most effective in processing error-diffused images.

In all such image conversion applications, the traditional low pass filtering approach has been characterized with blurred edges and loss of fine detail. Other converting techniques have provided some improvement as described above, but no known techniques have had a high-speed implementation that achieved high quality edge preservation, particularly in the conversion of error-diffused images and other halftones without a screen structure.

In accordance with the present invention, a Sigma filter algorithm is provided with edge-preserving smoothing. Image conversion is achieved by first identifying image data to be used in a Sigma filter by using a blurred halftone image, and then applying the Sigma filter to the original halftone image.

Figure 2:
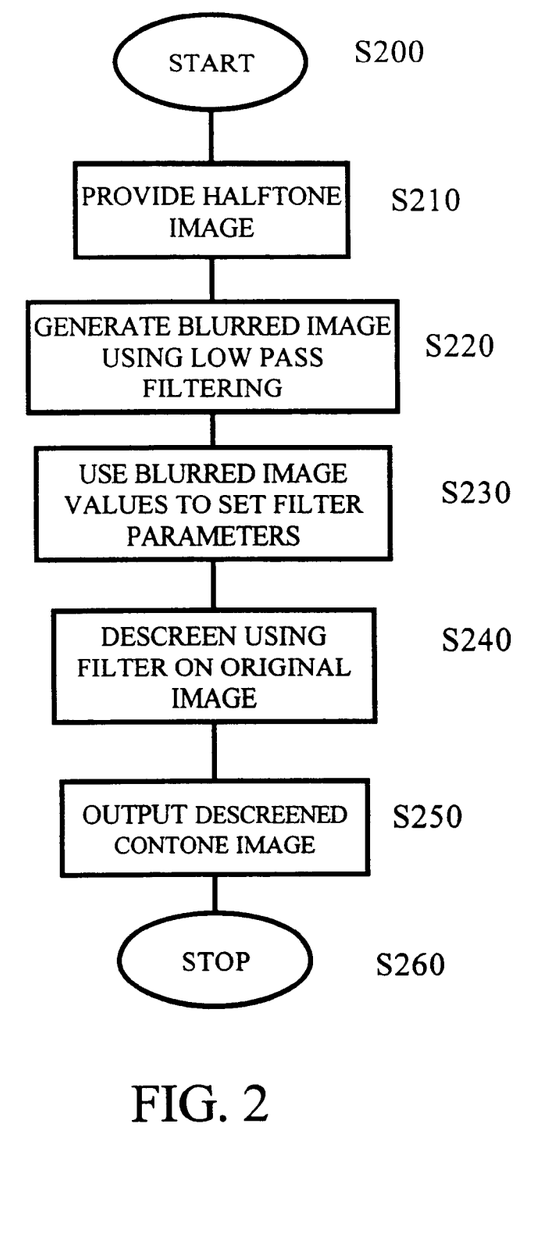
FIG. 2 shows a flow chart for a program executed in a computer in the reprographic system of FIG. 1 to convert or "unscreen" halftone images to continuous tone images in accordance with the present invention.

The basic descreening process will be described with reference to FIG. 2, where the process starts at step S200 and advances to step S210 where a halftone image is provided, such as from halftone scanner 18 or memory 20. From step S210, flow advances to step S220 where a blurred image is created from the original halftone image using low pass filtering. An example of such an image is shown in FIG. 4B. From step S220, flow advances to step S230, where the blurred image from step S220 is used to set filter data of a descreening filter, such as a Sigma filter. That is, the blurred image is used only to guide future image filtering, in which more intelligent Sigma filtering is guided by analysis of the low pass image, but which is applied to selected pixels of the original image. This avoids otherwise inevitable loss of detail when working on a low pass filtered version of the halftone image.

From step S230, flow advances to step S240 where the Sigma filter is used on the original halftone image (from step S210) rather than on the blurred image to descreen the original image into a contone image. From step S240, flow advances to step S250, where the descreened contone image is output such as to memory 22 or to printer 12. Then, the process stops at step S260.

The initial low pass filtering can be achieved by several methods. What is important is that it is just an initial rough filtering, which is used to more accurately control subsequent image filtering, which acts on the original rather than the blurred image. This reduces edge detail loss.

Figure 3:
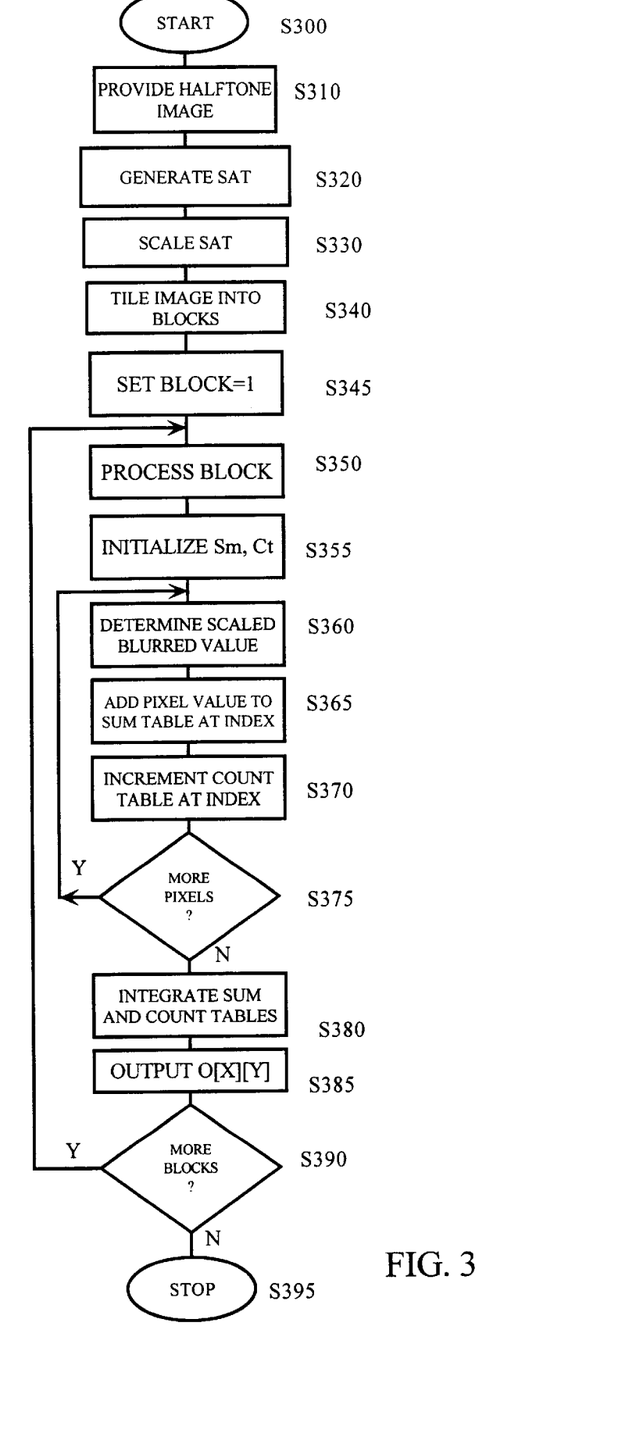
FIG. 3 shows in greater detail a Sigma filtering procedure employed in the program of FIG. 2.

An exemplary fast-implementation will be described with reference to FIG. 3, which is useful is rapidly generating a blurred image value and performing descreening. The process starts at step S300 and advances to step S310 where a halftone image is provided from a source such as halftone scanner 18 or memory 20. Flow then advances to step S320 where a summed-area-table (SAT) is generated. This is a table of values corresponding to the pixels of the image. The SAT value at position (x,y) is the sum of the pixel values in a rectangular area that includes the corner points (0,0), (0,y) (x,0) and (x,y). A SAT can be easily constructed when processing the pixels in raster order. Each new pixel value I[x][y] is added to a sum of the pixel values for the current scan (e.g., the sum of pixels from I[0][y] through I[x][y]). This result is added to the SAT value for the point above S[x][y−1] to yield a summed-area value for a current point S[x][y]. Such a summed-area table requires only two additions for each pixel.

Using the summed-area table, the sum of pixel values for rectangular regions can be easily found. These sums, when divided by the number of pixels in the region, provide an average pixel value that is, in effect, the value of the image after blurring with a box filter. To find the sum of values for a rectangle aligned with a minimum corner including the point at (p,q) and a maximum corner including the point (x,y), one need only computer the value:

$$S[x][y]-S[p-1][y]-S[x][q-1]+S[p-1][q-1]. \quad (1)$$

Thus, the sum of a rectangular region of pixel values can be found using only four additions. Finding the average pixel value of the region requires the division by the number of pixels. For example, a 3×3 rectangle would be divided by 9.

With the inventive technique, the blurred values are not used for imaging. Rather, they are used only for the selection of pixels to be filtered by a more advanced Sigma filter. As such, it is preferable for the process to use a scaled index. Accordingly, it is preferable for the process to proceed from step S320 to step S330, where a scaled average value (scaled to serve as an index into a convenient table) is provided. A scale factor is preferably selected such that the division is by a factor of 2 so that it can be performed using a simple shift. This simplifies computational requirements. For example, a 3×3 rectangle of pixel values ranging from 0 to 255 can be summed (resulting in values between 0 and 2295) and divided by 32. This results in blurred values that range between 0 and 71. From this, the scaled blurred image value B[x][y] from a 3×3 box filter for position (x,y) can be calculated as:

$$B[x][y]=(S[x+1][y+1]-S[X-2][y+1]-S[x+1][y-2]+S[x-2][y-2])>>\mathsection 2)$$

With this invention, the blurred image values are used to select pixels in the filtering process. That is, the average of the pixel values that have blurred values near the blurred value of the pixel of interest and are in the neighborhood of the pixel of interest are output. This tends to preserve edges because the pixels with the same blurred value will follow the edge.

In order to perform the calculations quickly, the "neighborhood" can be carefully chosen. For example, the process may advance from step S330 to step S340 where the image is tiled into a plurality of blocks (e.g., 8×8 blocks of pixels or any other suitable size). Pixels are then processed and output in a block-by-block fashion. For every block processed, there is a corresponding block that is analyzed. However, the size of the analysis block can be greater than the output block.

For example, when processing an 8×8 block of pixels, a 10×10 rectangular block of pixels can be analyzed to give a 1 pixel border around the output block. Thus, while the output blocks are tiled, the analysis block can be larger and overlap. The analysis blocks is considered to be the neighborhood for every pixel in the corresponding output block.

A first block is set and used at step S345 and flow advances to step S350 where the selected block is processed. The analysis makes use of two tables Sm and Ct. One table sums pixel values while the second table counts occurrences of pixel values. These tables are indexed by the scaled blurred values from the SAT and their size should preferably correspond to the range of possible index values. Thus, for example, if the scaled blurred values can range between 0 and 71, the sum table and the count table should hold at least 72 elements, and should additionally contain at least one additional element for the filtering calculation (corresponding to index−1).

These tables Sm and Ct are initialized to zero at step S355:

for (j=−1; j<TABLESIZE; j++)
    Sm[j]=Ct[j]=0

Then, the analysis process at step S360 determines a corresponding scaled blurred pixel value for a selected position in the block. (This is repeated for every position in the block). These values can be found by using the summed-area table described earlier. These values are needed a second time during output processing. Therefore, it may be most efficient to store them in a memory rather than recalculating them. However, the calculation is relatively simple so if memory constraints are an issue, recalculation may be preferable in some lower cost applications.

The scaled blurred value from step S360 is used as an index in the sum and count tables. In step S365, the original pixel value is added to the sum table at this location, and the element at this index in the count table is incremented at step S370 as follows:

for(y=FirstRowOfAnalysisBlock;
    y<=LastRowOfAnalysisBlock; y++)
    for(x=FirstColumnOfAnalysisBlock;c<=
        LastColumnOfAnalysis Block;x++)

```
{
    Sm[B[x][y]]+=I[x][y];
    Ct[B[x][y]]++;
}
```

From step S370, flow advances to decision step S375, where it is determined whether additional pixel positions in the block need to be analyzed. If so, flow returns to step S360. Otherwise, flow advances to step S380. Once every position in the analysis block has been processed, the third stage of analysis can be performed.

This stage involves the integration of the sum and count tables. In particular, at step S380, each table (Sm and Ct) is stepped through from low index to high index and each value is replaced by the sum of it and preceding values:

```
{
    Sm[j]+=Sm[j−1];
    Ct[j]+=Ct[j−1];
}
```

After this is performed, the final output can now be generated for the block at step S385. One will notice that the difference between two entries in the sum table is the sum of all pixel values in the analysis block with a scaled blurred value between the entry's indices. Likewise, the difference between two count table entries allows calculation of the average pixel value for the set of pixels in the analysis block with a scaled blurred value within some parameter d of the scaled blurred value of the pixel of interest. Selection of the optimal value for d can depend upon the frequency of the halftone being removed and on the amount of blurring used, but an amount of about 5% of the pixel range is not unreasonable.) The calculated average is the output O[x][y].

This is shown in the code fragment below that also includes bounds checking to make sure that the entries sought remain within the limits of the tables. However, bounds checking is not always necessary and can be avoided by extending the table by d at the top and bottom, and filling in these extra entries with the value of the first and last original table entries:

for(y=FirstRowOfOutputBlock;y<=
    LastRowOfOutputBlock;y++)
    for(x=FirstColumnOfOutputBlock;x<=
        LastColumnOfOutput Block;x++)

```
{
    j2=B[x][y]+d;
    if (j2>=TABLESIZE)
        j2=TABLESIZE −1;
    j1=B[x][y]−d − 1;
    if (j1<−1)
        j1=−1
    O[x][y]=(Sm[j2]−Sm[j1])/(Ct[j2]−Ct[j1]);
}
```

Descreening of the image is achieved by repeating these steps for every block of the image. That is, if more blocks require analysis, the decision gate at step S390 returns flow back to step S350. Otherwise, if all of the blocks have been analyzed, flow advances to step S395 where the process is stopped and a completely descreened image is formed, which can be edited or printed.

The final output contone image is one that results from a relatively simply built programmed procedure, yet it represents substantial improvement over the prior art especially from the standpoint of avoidance of edge blurring and preservation of fine detail. Further, the procedure is relatively insensitive to the screen structure and is adaptable to use with color images. More importantly, descreening can be achieved in a single iteration of the Sigma filter, rather than the necessity for application of several iterations of smaller Sigma filters as in the prior art. This substantially reduces processing time. Also, use of the block analysis further reduces computation and processing time.

Figure 4A:
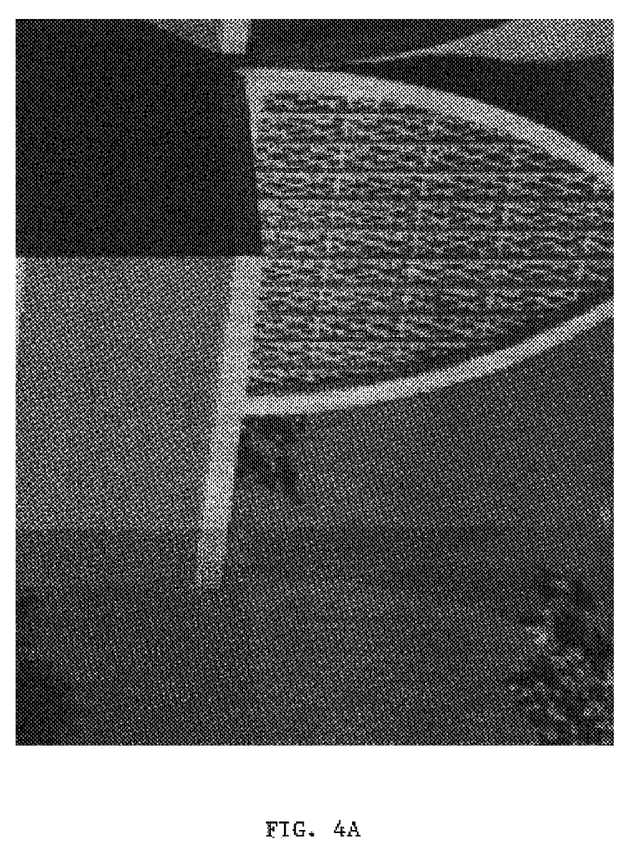
FIG. 4A shows a halftoned original.
Figure 4B:
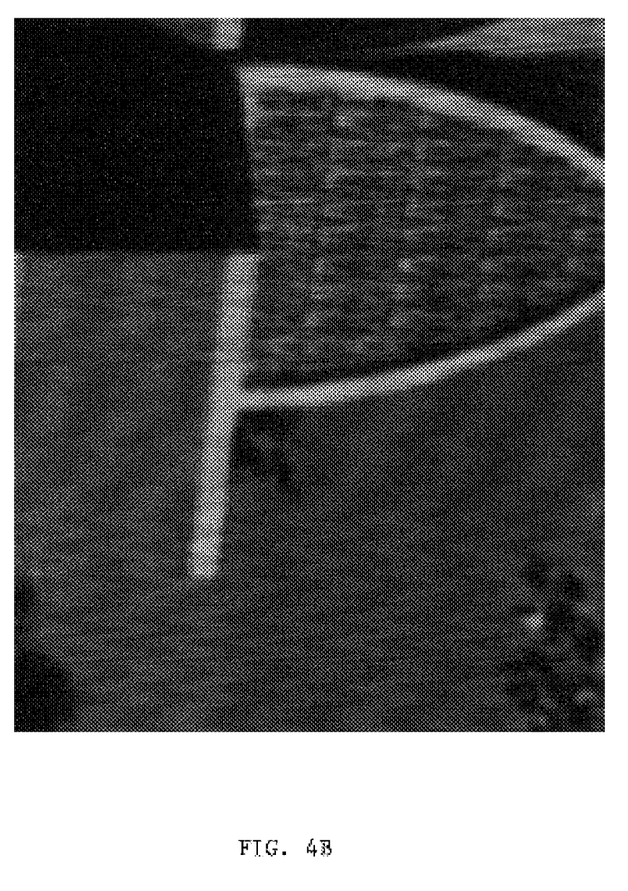
FIG. 4B shows a halftoned original having the halftone removed by a low-pass filtering.
Figure 4C:
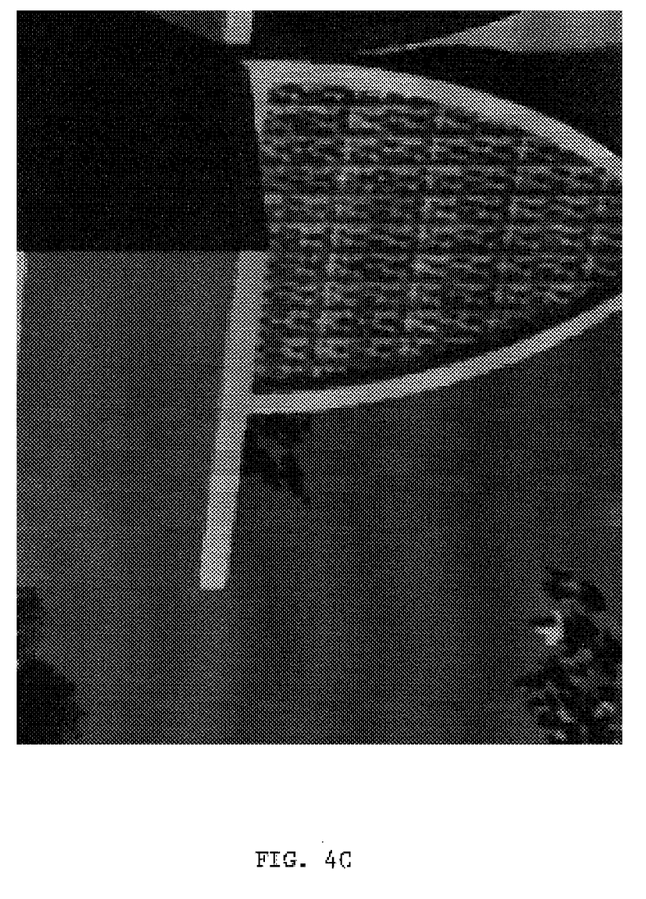
FIG. 4C shows a continuous tone output image "descreened" from the original image of FIG. 4A by the process of FIG. 3.

FIGS. 4A–C present color images that illustrate improvements provided by the invention. The image in FIG. 4A is an original halftone image while FIG. 4B is the image of FIG.

4A after low-pass filtering to remove the halftone. FIG. 4C shows an improved continuous tone image in which the halftone of FIG. 4A has been "descreened" based on data from a blurred image (such as low-pass filtered data from FIG. 4B) to form a continuous tone image output as a result of the processes of FIGS. 2 and 3.

This is an exemplary embodiment of the descreening process. Other variations are possible and form part of the invention. For example, instead of using a single analysis block for each output block, sum and count tables may be calculated from several smaller analysis blocks. One would then employ total sum and count values from the several analysis blocks that form a neighborhood around the output block. As the process moves to the next output block, some new analysis tables would be calculated; however, some of the previous tables from the previous neighborhood could be reused.

This invention also can be applied to color rather than merely monochromatic screening. For this, the technique can be applied to each color plane independently. Alternatively, one could use the color separation for the selection (only one scaled blurred image and only one count table) and apply this selection to all separations, while using separate sum tables for each color separation.

Also, while the exemplary embodiment provides a fast implementation specifically designed to best perform on medium to high frequencies, the method is also applicable to low screen frequencies, provided a block size is chosen and a Sigma filter is applied with parameters of the filter being suitable to the low screen frequency. The Sigma filter may be similar to that described in U.S. Pat. No. 5,243,444 to Fan, assigned to the same assignee as the present invention and incorporated herein by reference in its entirety. However, rather than being applied to the initially blurred image, it is applied to the original halftone image. Thus, the blurred image is only used as a means to select pixel values contributing to the filtered value.

The exemplary embodiment provides a fast implementation by dividing the image into non-overlapping blocks, and only collecting the image statistics in the Sm and Ct tables once for each block. An alternative embodiment uses a sliding window instead of non-overlapping blocks. The window is centered at each pixel being analyzed and the Sm and Ct data used in calculating the pixel replacement value is gathered independently for each pixel's window. While this slows the process, it can also yield better image quality since the data used in calculating the replacement value for a pixel is guaranteed to come from a region that is centered on that pixel.

One problem with the block-based fast implementation is that smooth, slowly varying regions can look blocky. This is because essentially all of the pixels within the block will contribute to the filtered values, which results in essentially all of the pixels in the block being replaced by the block average. This problem is, however, easy to remedy. Examining the Ct table yields the number of pixels contributing to the filter average. If this number is greater than a predetermined threshold (such as half the block size) then one can assume that the neighborhood of the pixel is smooth, and instead of using the Sigma filter, one can select an alternative filtering method such as the simple low-pass filter value that is already available. This removes the blockiness from the descreened image, while retaining the virtues of the Sigma filter in regions of edges and image activity. One can also check for too few pixels contributing to the pixel average and select an alternative filtering method when there are insufficient contributing pixels to form a good average. Again, the simple low-pass filter value might be used.

While the preferred embodiment describes single-pass filtering for speed, another embodiment could employ multiple filterings based on a single initial blurred image. In this embodiment, the blurred image is calculated and used to select original pixel values for use in the Sigma filter. These original pixel values are collected in the Sm table and used to generate the first-pass output values for the block. On a second pass, the blurred image is again used to select pixels, but this time it is the first-pass output values that are used to form the Sm table, and the Sigma filter then produces a second-pass output for the block. This process can be iterated as desired. Using multiple passes with a small d parameter in the Sigma filter may yield better image quality than using a single pass with a larger d value, but at a cost of reduced speed.

The foregoing description of the preferred embodiment of the invention has been presented for purposes of illustration and description. The description is not intended to be exhaustive or to limit the invention to the precise form disclosed, and modifications and variations of the invention may be made in light of the above disclosure or may be developed from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image processing system for converting unscreened and other halftone images to continuous tone images, said system comprising:

means for receiving an original halftone image including a plurality of pixels;

means for generating a blurred image from the original halftone image using low pass filtering;

means for tiling the halftone image into multiple blocks;

means for setting Sigma filter data on a block-by-block basis using the blurred image;

means for descreening the original halftone image by applying a Sigma filter to pixels of the original halftone image; and means for generating an output continuous tone image containing Sigma filtered pixels for storage or subsequent processing.

2. The image processing system of claim 1, wherein the means for descreening descreens in a single iteration.

3. The image processing system of claim 1, wherein the halftone image is an error diffused image.

4. The image processing system of claim 1, wherein the means for generating a blurred image includes an averaging filter.

5. The image processing system of claim 1, wherein the means for generating a blurred image includes a summed-area table.

6. The image processing system of claim 5, wherein the blurred value is scaled.

7. The image processing system of claim 1, wherein the Sigma filter includes a sum table and a count table.

8. The image processing system of claim 1, further comprising means for further descreening the output continuous tone image by applying another Sigma filter to pixels of the continuous tone image; and means for generating a second output continuous tone image containing further descreened Sigma filtered pixels for storage or subsequent processing.

9. An image processing system for converting unscreened and other halftone images to continuous tone images, said system comprising:
   means for receiving an original halftone image including a plurality of pixels;
   means for generating a blurred image from the original halftone image using low pass filtering;
   means for setting Sigma filter data using the blurred image;
   means for descreening the original halftone image by applying a Sigma filter to pixels of the original halftone image; and
   means for generating an output continuous tone image containing Sigma filtered pixels for storage or subsequent processing, wherein the Sigma filter includes a sum table and a count table and means for integrating the sum table and the count table.

10. The image processing system of claim 9, wherein the means for generating an output continuous tone image includes means for calculation of an average pixel value for a set of pixels in an analysis block with a scaled blurred value within a predetermined value of a pixel of interest.

11. The image processing system of claim 10, wherein if the number of pixels in the analysis block with a blurred value within a predetermined distance from a blurred value of the pixel of interest is above a predetermined threshold for the analysis block, indicating a smooth neighborhood of pixel values about the pixel of interest, a filter other than a Sigma filter is selected for determining of pixel value for the pixel of interest in the analysis block.

12. The image processing system of claim 11, wherein the selected filter is low-pass filtering.

13. The image processing system of claim 11, wherein the pixel value from the blurred image is used as the pixel value for the pixel of interest in the analysis block.

14. The image processing system of claim 10, wherein if the number of pixels in the analysis block with a blurred value within a predetermined distance from a blurred value of the pixel of interest is below a predetermined threshold for the analysis block, a filter other than a Sigma filter is selected for determining of pixel value for the pixel of interest in the analysis block.

15. The image processing system of claim 14, wherein the selected filter is low-pass filtering.

16. The image processing system of claim 14, wherein the pixel value from the blurred image is used as the pixel value for the pixel of interest in the analysis block.

17. An image processing system for converting unscreened and other halftone images to continuous tone images, said system comprising:
   means for receiving an original halftone image including a plurality of pixels;
   means for generating a blurred image from the original halftone image using low pass filtering;
   means for setting Sigma filter data using the blurred image;
   means for descreening the original halftone image by applying the Sigma filter to pixels of the original halftone image; and
   means for generating an output continuous tone image containing Sigma filtered pixels for storage or subsequent processing, wherein the means for setting Sigma filter data includes means for tiling the halftone image into overlapping blocks.

18. A method for converting screened and other halftone images to continuous tone images, the steps of said method comprising:
   receiving an original halftone image comprising a plurality of halftone image pixels;
   generating a blurred image from the original halftone image by low-pass filtering the halftone image pixels;
   setting data of a Sigma filter based on the blurred image;
   applying the Sigma filter to select pixels of the original halftone image; and
   generating an output continuous tone image containing the Sigma filtered pixels for storage or subsequent processing, wherein the step of applying the Sigma filter is performed in a single iteration.

19. The method of claim 18, wherein the original halftone image is an error diffused image.

20. The method of claim 18, wherein the low pass filtering applies an averaging filter.

21. The method of claim 18, wherein the step of generating a blurred image is based on a summed-area table of the original halftone image.

22. The method of claim 21, wherein the blurred image values are scaled.

23. The method of claim 18, further comprising a step of tiling the pixels into overlapping blocks.

24. The method of claim 18, further comprising:
   setting data of a second iterative Sigma filter based on the blurred image;
   applying the Sigma filter to select pixels of the continuous tone image; and
   generating a second output continuous tone image containing the second iterative Sigma filtered pixels for storage or subsequent processing.

25. A method for converting screened and other halftone images to continuous tone images, the steps of said method comprising:
   receiving an original halftone image comprising a plurality of halftone image pixels;
   generating a blurred image from the original halftone image by low-pass filtering the halftone image pixels;
   tiling the halftone image into blocks;
   setting data of a Sigma filter based on the blurred image;
   applying the Sigma filter to select pixels of the original halftone image on a block-by-block basis; and
   generating an output continuous tone image containing the Sigma filtered pixels for storage or subsequent processing.

26. The method of claim 25, further comprising generation of a sum table and a count table for each block.

27. The method of claim 26, further comprising integrating the sum table and the count table.

28. The method of claim 26, wherein the step of outputting includes calculation of an average pixel value for a set of pixels in an analysis block with a scaled blurred value within a predetermined value of a pixel of interest.

29. The method of claim 28, wherein if the number of pixels in the analysis block with a blurred value within a predetermined distance from a blurred value of the pixel of interest is above a predetermined threshold, indicating a smooth neighborhood of pixel values around the pixel of interest, a filter other than a Sigma filter is selected for determining of the pixel value for the pixel of interest in the analysis block.

30. The method of claim 29, wherein the selected filter is low-pass filtering.

31. The method of claim 29, wherein the pixel value from the blurred image is used as the pixel value for the pixel of interest in the analysis block.

32. The method of claim 28, wherein if the number of pixels in the analysis block with a blurred value within a predetermined distance from a blurred value of the pixel of interest is below a predetermined threshold, a filter other than a Sigma filter is selected for determining of the pixel value for the pixel of interest in the analysis block.

33. The method of claim 32, wherein the selected filter is low-pass filtering.

34. The method of claim 32, wherein the pixel value from the blurred image is used as the pixel value for the pixel of interest in the analysis block.

35. An image processing system for converting unscreened and other halftone images to continuous tone images, said system comprising:

means for receiving an original halftone image including a plurality of pixels;

means for generating a blurred image from the original halftone image using low pass filtering;

means for setting Sigma filter data using the blurred image;

means for descreening the original halftone image by applying a Sigma filter to pixels of the original halftone image; and     means for generating an output continuous tone image containing Sigma filtered pixels for storage or subsequent processing, wherein the means for descreening descreens in a single iteration.

\* \* \* \* \*